United States Patent Office 2,740,791
Patented Apr. 3, 1956

2,740,791

PREPARATION OF A SERIES OF NEW 3-AMINO-2-OXAZOLIDONES

Gabriel Gever, Oxford, N. Y., assignor, by mesne assignments, to The Norwich Pharmacal Company, Norwich, N. Y., a corporation of New York No Drawing. Original application February 28, 1952, Serial No. 274,067, now Patent No. 2,652,402, dated September 15, 1953. Divided and this application July 29, 1953, Serial No. 371,179

1 Claim. (Cl. 260—307)

This invention relates to a new series of chemical compounds and the preparation thereof. The series consists of a number of closely related 3-amino-2-oxazolidones. They are described by the general formula:

$$H_2N-N\underset{\underset{R}{\overset{|}{C}}\underset{R_1\ R_2}{\overset{|}{-}}\underset{R_3}{\overset{|}{C}}}{\overset{C=O}{\diagdown}}O$$

wherein

R is a member of the group consisting of hydrogen, lower alkyl and hydroxy (lower) alkyl
R₁ is a member of the group consisting of hydrogen, lower alkyl and hydroxy (lower) alkyl
R₂ is a member of the group consisting of hydrogen, lower alkyl and hydroxy (lower) alkyl, and
R₃ is a member of the group consisting of hydrogen, lower alkyl and hydroxy (lower) alkyl.

The new compounds of the series are particularly useful as intermediates for the preparation of members of a series of N-(5-nitro-2-furyl)alkylidene-3-amino-2-oxazolidones, notably, N - (5 - nitro - 2 - furfurylidene)-3-amino-2-oxazolidone, which I have invented and which form the subject of my co-pending application, Serial No. 274,066, filed February 28, 1952. This application is a division of my co-pending application Serial No. 274,067 filed February 28, 1952, now U. S. Patent No. 2,652,402.

The various members of the new series of 3-amino-2-oxazolidones can be prepared by the catalytic reduction of the corresponding 3-nitro-2-oxazolidone derivative. The nitro compound is prepared by nitration of the selected 2-oxazolidone derivative under known conditions for the preparation of nitro derivatives. Hydrogenation of the nitro compound is carried out at atmospheric pressure and at a temperature within the range of 0° to 5° C. using Adams' platinum oxide as a catalyst. In approximately five hours nearly the theoretical amount of hydrogen is absorbed, whereupon the catalyst is filtered out.

In order that my invention may be entirely available to those skilled in the art, the preparation by my method of a specific member of the series of new compounds is described briefly:

EXAMPLE 3-amino-2-oxazolidone $$H_2N-N\underset{\underset{}{\overset{|}{CH_2-CH_2}}}{\overset{C=O}{\diagdown}}O$$

To a suspension of 2.3 g. of 3-nitro-2-oxazolidone in a mixture of 37.66 cc. of water and 12.34 cc. of 4.053 N hydrochloric acid is added 0.07 g. of Adams' platinum oxide catalyst. Hydrogenation is then carried out at atmospheric pressure and at a temperature of 0–5° C. After five hours, 101% of the theoretical amount of hydrogen is absorbed. The catalyst is removed by filtration, leaving a solution of 3-amino-2-oxazolidone in 55% yield.

What I claim is:

The method of preparing a 3-amino-2-oxazolidone represented by the formula:

$$H_2N-N\underset{\underset{R}{\overset{|}{C}}\underset{R_1\ R_2}{\overset{|}{-}}\underset{R_3}{\overset{|}{C}}}{\overset{C=O}{\diagdown}}O$$

wherein

R represents a member of the group consisting of hydrogen, lower alkyl and hydroxy (lower) alkyl
R₁ represents a member of the group consisting of hydrogen, lower alkyl and hydroxy (lower) alkyl
R₂ represents a member of the group consisting of hydrogen, lower alkyl and hydroxy (lower) alkyl
R₃ represents a member of the group consisting of hydrogen, lower alkyl and hydroxy (lower) alkyl which comprises reducing a 3-nitro-2-oxazolidone represented by the formula:

$$O_2N-N\underset{\underset{R}{\overset{|}{C}}\underset{R_1\ R_2}{\overset{|}{-}}\underset{R_3}{\overset{|}{C}}}{\overset{C=O}{\diagdown}}O$$

wherein R, R₁, R₂ and R₃ have the significance above given, by suspending it in dilute hydrochloric acid in the presence of Adams' platinum oxide catalyst.

References Cited in the file of this patent

UNITED STATES PATENTS 2,652,402     Gever _____ Sept. 15, 1953

OTHER REFERENCES

Wiley: Chem. Reviews, vol. 37, p. 431 (1945).
Lieber et al.: JACS, vol. 59, pp. 1834–35 (1937).
Berkmann et al.: "Catalysis" (Reinhold), p. 840 (1940).